Patented Aug. 6, 1929.

1,723,556

UNITED STATES PATENT OFFICE.

KURT H. MEYER AND HANS KRZIKALLA, OF MANNHEIM, GERMANY, ASSIGNORS TO GENERAL ANILINE WORKS, INC., OF NEW YORK, N. Y., A CORPORATION OF DELAWARE.

PRODUCTION OF GREEN HYDRATED CHROMIUM OXIDE.

No Drawing. Application filed March 8, 1928, Serial No. 260,238, and in Germany March 15, 1927.

This invention relates to the production of green hydrated chromium oxide.

For the production of brilliant green hydrated chromium oxide, use is made in the art mainly of fusion products prepared by heating salts of hexavalent chromium with a large excess of boric acid. The preparation of these chromium oxides, which are known in commerce under various names, particularly Guignet's green, is a tiresome matter because the difficultly soluble boric acid has to be removed from the melt and recovered.

We have now found that brilliant green hydrated chromium oxide can be produced in a simple manner, without boric acid, by heating chromic acid, or its salts, with reducing agents at a pressure above atmospheric but below 150 atmospheres, and in the presence of water. According to the conditions employed, this method readily furnishes hydrated chromium oxide with varying contents of water and consequently of different shades. The chromium oxide with higher water content, which can also be prepared at lower temperatures, is usually of a darker green than that with lower water content.

The reducing agent may consist of a great variety of organic or inorganic substances with a reducing action, such, for example, as hydrogen, hydrocarbons, carbon monoxide, formates, glycerine, sodium thiosulfate and the like, or mixtures thereof. We have found that it is most preferable to work with reducing agents which are not liable of contaminating the finished products, as may happen when employing saw dust or other carbonizable or coaly matter. It is therefore most advisable either to use organic reducing agents which do not belong to the aforesaid group, or to employ inorganic reducing agents. On the other hand sulfurous acid should not be employed as, when working therewith, the process is complicated by the formation of chromium sulfates which must be decomposed by means of alkaline agents.

The products may preferably be employed as a pigment, for example in the manufacture of oil lacquers, distempers or printing inks, or it may find application, in conjunction with substrata, as paint.

The following examples will further illustrate the nature of the said invention which however is not limited thereto. The parts, where not otherwise stated, are by weight.

Example 1.

342 parts of crystallized sodium chromate are heated and stirred with 600 parts of water and 140 parts of sodium formate, for about 10 hours at from 270° to 280° C. in an autoclave. After cooling down to about 90° C., the handsome green hydrated chromium oxide is filtered by suction, washed until neutral and dried. If the reduction be effected at from 200° to 210° C., a handsomer and darker chromium oxide green, containing from about 22 to 24 per cent of water, is obtained.

The reaction proceeds in accordance with the equation

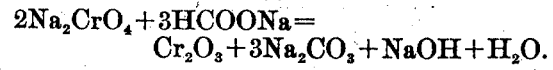
$$2Na_2CrO_4 + 3HCOONa = Cr_2O_3 + 3Na_2CO_3 + NaOH + H_2O.$$

Accordingly, the whole of the sodium in the initial materials is obtained as a by-product in the form of alkali suitable for direct utilization. Instead of using sodium formate as the reducing agent, carbon monoxide may be forced into the chromium solution, or other organic reducing agents, such as glycerine and the like may be employed.

Example 2.

342 parts by weight of crystallized sodium chromate and 600 parts of water, with 25 parts by weight of flowers of sulfur as reducing agent, are heated for 10 hours in an autoclave, with stirrers, in such a manner that the pressure gauge registers 40 atmospheres. After cooling, the further treatment proceeds as in Example 1. A handsome green chromium oxide is obtained.

Sulfur may be replaced by other reducing agents, such as carbon in the form of lampblack or powdered wood charcoal. Whereas the reduction with flowers of sulfur, according to the above example, furnishes Glauber salt as by-product, the reduction with carbon gives sodium carbonate and bicarbonate.

Mixtures of reducing agents may also be employed.

Example 3.

An aqueous solution of about 30 to 40 per cent of potassium chromate is heated to 270° C. in an autoclave fitted with a stirrer and a pressure gauge, whereupon hydrogen is introduced until the pressure amounts to 110 atmospheres. In accordance with the gradual consumption, hydrogen is introduced so that the said pressure is maintained, until the absorption has ceased. After cooling, the insoluble, handsome green hydrated chromium oxide is separated from the resulting caustic soda solution by filtration by suction and washed. The hydrogen may be replaced by a mixture of carbon monoxide and hydrogen, such as water gas or by other reducing gases such as methane, acetylene or the like, or mixtures thereof or mixtures of gases containing the latter.

What we claim is:

1. A process for the production of green hydrated chromium oxide which consists in heating a compound of hexavalent chromium in the presence of water at a pressure above atmospheric pressure but below 150 atmospheres with a reducing agent, other than sulfurous acid.

2. A process for the production of green hydrated chromium oxide which consists in heating a compound of hexavalent chromium in the presence of water at a pressure above atmospheric pressure but below 150 atmospheres with reducing agents comprising an inorganic constituent, but other than sulfurous acid.

3. A process for the production of green hydrated chromium oxide which consists in heating an aqueous solution of a chromate at a pressure above atmospheric pressure, but below 150 atmospheres with a reducing agent, but other than sulfurous acid.

4. A process for the production of green hydrated chromium oxide which consists in treating a solution of a compound of hexavalent chromium at a temperature above 200° C. and at a pressure above atmospheric pressure but below 150 atmospheres with a reducing agent, but other than sulfurous acid.

5. A process for the production of green hydrated chromium oxide which consists in heating an aqueous solution of a chromate at a pressure above atmospheric pressure, but below 150 atmospheres with sulfur.

In testimony whereof we have hereunto set our hands.

KURT H. MEYER.
HANS KRZIKALLA.